United States Patent
Stolfo et al.

(10) Patent No.: US 9,519,778 B2
(45) Date of Patent: *Dec. 13, 2016

(54) SYSTEMS, METHODS, AND MEDIA FOR OUTPUTTING A DATASET BASED UPON ANOMALY DETECTION

(71) Applicant: The Trustees of Columbia University in the City of New York, New York, NY (US)

(72) Inventors: Salvatore J Stolfo, Ridgewood, NJ (US); Ke Wang, Sunnyvale, CA (US); Janak Parekh, Manhasset, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 886 days.

This patent is subject to a terminal disclaimer.

(21) Appl. No.: 13/769,774

(22) Filed: Feb. 18, 2013

(65) Prior Publication Data
US 2014/0082725 A1 Mar. 20, 2014

Related U.S. Application Data

(63) Continuation of application No. 12/280,969, filed as application No. PCT/US2007/005408 on Feb. 28, 2007, now Pat. No. 8,381,299.
(Continued)

(51) Int. Cl.
H04L 29/06 (2006.01)
G06F 21/56 (2013.01)

(52) U.S. Cl.
CPC .............. *G06F 21/56* (2013.01); *G06F 21/564* (2013.01); *H04L 63/1416* (2013.01); *H04L 63/1425* (2013.01); *G06F 2221/034* (2013.01)

(58) Field of Classification Search
CPC .... G06F 21/56; G06F 21/564; H04L 63/1416; H04L 63/1425
(Continued)

(56) References Cited

U.S. PATENT DOCUMENTS 5,440,723 A 8/1995 Arnold et al.
5,452,442 A 9/1995 Kephart
(Continued)

OTHER PUBLICATIONS

Barreno, M., et al. "Can Machine Learning Be Secure?", In Proceedings of the 2006 ACM Symposium on Information, Computer and Communications (ASIACCS '06), Taipei, Taiwan, Mar. 21-24, 2006, pp. 16-25.
(Continued)

*Primary Examiner* — Michael S McNally
(74) *Attorney, Agent, or Firm* — Byrne Poh LLP

(57) ABSTRACT

Systems, methods, and media for outputting a dataset based upon anomaly detection are provided. In some embodiments, methods for outputting a dataset based upon anomaly detection: receive a training dataset having a plurality of n-grams, which plurality includes a first plurality of distinct training n-grams each being a first size; compute a first plurality of appearance frequencies, each for a corresponding one of the first plurality of distinct training n-grams; receive an input dataset including first input n-grams each being the first size; define a first window in the input dataset; identify as being first matching n-grams the first input n-grams in the first window that correspond to the first plurality of distinct training n-grams; compute a first anomaly detection score for the input dataset using the first matching n-grams and the first plurality of appearance frequencies; and output the input dataset based on the first anomaly detection score.

18 Claims, 7 Drawing Sheets

Related U.S. Application Data

(60) Provisional application No. 60/778,008, filed on Feb. 28, 2006, provisional application No. 60/790,626, filed on Apr. 10, 2006.

(58) Field of Classification Search
USPC .......................................................... 726/24
See application file for complete search history.

(56) References Cited

U.S. PATENT DOCUMENTS

| | | | |
|---|---|---|---|
| 5,701,464 | A | 12/1997 | Aucsmith |
| 5,991,714 | A | 11/1999 | Shaner |
| 6,081,325 | A | 6/2000 | Leslie et al. |
| 7,389,538 | B2 | 6/2008 | Wells |
| 7,493,233 | B1* | 2/2009 | Brown ................ G06F 17/2715 702/181 |
| 7,805,460 | B2 | 9/2010 | Artan et al. |
| 2003/0014662 | A1 | 1/2003 | Gupta et al. |
| 2003/0182310 | A1* | 9/2003 | Charnock ......... G06F 17/30716 |
| 2004/0111410 | A1* | 6/2004 | Burgoon ........... G06F 17/30536 |
| 2005/0022028 | A1 | 1/2005 | Hall |
| 2005/0249214 | A1* | 11/2005 | Peng ................... H04L 63/1458 709/224 |
| 2006/0015630 | A1* | 1/2006 | Stolfo ................... G06F 21/552 709/230 |
| 2006/0149674 | A1* | 7/2006 | Cook ..................... G06Q 20/40 705/44 |
| 2008/0189784 | A1 | 8/2008 | Mangione-Smith et al. |
| 2009/0024555 | A1* | 1/2009 | Rieck ........................ G06F 7/02 706/54 |
| 2009/0172815 | A1* | 7/2009 | Gu ......................... G06F 21/552 726/23 |
| 2009/0193293 | A1* | 7/2009 | Stolfo ................... G06F 21/564 714/26 |
| 2010/0064368 | A1* | 3/2010 | Stolfo ................... G06F 21/564 726/24 |

OTHER PUBLICATIONS

Bloom, B.H., "Space/Time Trade-Offs in Hash Coding with Allowable Errors", In Communications of the ACM, vol. 13, No. 7, Jul. 1970, pp. 422-426.

Christodorescu, M. and Jha, S., "Static Analysis of Executables to Detect Malicious Patterns", In Proceedings of the 12th USENIX Security Symposium (SSYM '03), Washington, DC, USA, Aug. 4-8, 2003, pp. 169-186.

Cowan, C., et al., "Stackguard: Automatic Adaptive Detection and Prevention of Buffer-Overflow Attacks", In Proceedings of the 7th USENIX Security Symposium (SSYM '98), San Antonio, TX, USA, Jan. 26-29, 1998, pp. 63-78.

Crandall, J.R., et al., "On Deriving Unknown Vulnerabilities from Zero-Day Polymorphic and Metamorphic Worm Exploits", In Proceedings of the 12th ACM Conference on Computer and Communication Security (CCS '05), Alexandria, VA, USA, Nov. 7-11, 2005, pp. 235-248.

Detristan, T., et al., "Polymorphic Shellcode Engine Using Spectrum Analysis", In Phrack, vol. 61, Aug. 13, 2003, available at: http://www.phrack.org/issues.html?issue=61&id=9.

Dharmapurikar, S., et al., "Deep Packet Inspection Using Parallel Bloom Filters", In IEEE Micro, vol. 24, No. 1, Jan.-Feb. 2004, pp. 52-61.

Eskin, E., "Sparse Sequence Modeling with Applications to Computational Biology and Intrusion Detection", Dissertation, Columbia University, Apr. 2002, pp. 1-147.

Forrest, S., et al., "A Sense of Self for Unix Processes", In Proceedings of the IEEE Symposium on Security and Privacy (S&P '96), Oakland, CA, US, May 6-8, 1996, pp. 120-128.

International Preliminary Report on Patentability in International Patent Application No. PCT/US2007/05406, filed Feb. 28, 2007, mailed Sep. 12, 2008.

International Preliminary Report on Patentability in International Patent Application No. PCT/US2007/05408, filed Feb. 28, 2007, mailed Sep. 12, 2008.

International Search Report in International Patent Application No. PCT/US2007/05406, filed Feb. 28, 2007, mailed Mar. 31, 2008.

International Search Report in International Patent Application No. PCT/US2007/05408, filed Feb. 28, 2007, mailed Mar. 6, 2008.

Kim, H.A. and Karp, B., "Autograph: Toward Automated, Distributed Worm Signature Detection", In Proceedings of the 13th USENIX Security Symposium, San Diego, CA, USA, Aug. 9-13, 2004, pp. 271-286.

Kolesnikov, O., et al., "Advanced Polymorphic Worms: Evading IDS by Blending in with Normal Traffic", Technical Report GIT-CC-04-15, Georgia Institute of Technology, 2004-2005, pp. 1-22.

Kreibich, C. and Crowcroft, J., "Honeycomb—Creating Intrusion Detection Signatures Using Honeypots", In Proceedings of the Second Workshop on Hot Topics in Networks (HotNets-II), Boston, MA, USA, Nov. 20-21, 2003, pp. 51-56.

Kruegel, C., et al., "Polymorphic Worm Detection Using Structural Information of Executables", In Proceedings of the 8th International Symposium on Recent Advances in Intrusion Detection (RAID '05), Seattle, WA, USA, Sep. 7-9, 2005, pp. 207-226.

Krugel, C., et al., "Service Specific Anomaly Detection for Network Intrusion Detection", In Proceedings of the 2002 ACM Symposium on Applied Computing (SAC '02), Madrid, ES, Mar. 10-14, 2002, pp. 201-208.

Liang, Z. and Sekar, R., "Fast and Automated Generation of Attack Signatures: A Basis for Building Self-Protecting Servers", In Proceedings of the 12th ACM Conference on Computer and Communications Security (CCS '05), Alexandria, VA, USA, Nov. 7-11, 2005, pp. 213-222.

Locasto, M.E., et al., "Application Communities: Using Monoculture for Dependability", In Proceedings of the 1st Workshop on Hot Topics in System Dependability (HotDep '05), Yokohama, Japan, Jun. 30, 2005, pp. 1-5.

Locasto, M.E., et al., "Bloodhound: Searching Out Malicious Input in Network Flows for Automatic Repair Validation", Technical Report, Columbia University, 2006, pp. 1-17.

Locasto, M.E., et al., "FLIPS: Hybrid Adaptive Intrusion Prevention", In Proceedings of the 8th International Symposium on Recent Advances in Intrusion Detection (RAID '05), Seattle, WA, USA, Sep. 7-9, 2005, pp. 82-101.

Locasto, M.E., et al., "Software Self-Healing Using Collaborative Application Communities", In Proceedings of the Network and Distributed System Security Symposium (NDSS '06), San Diego, CA, USA, Feb. 1-3, 2006, pp. 1-13.

Marceau, C., "Characterizing the Behavior of a Program Using Multiple-Length N-Grams", In Proceedings of the New Security Paradigms Workshop (NSPW '00), Co. Cork, Ireland, Sep. 18-21, 2000, pp. 101-110.

Moore, D., et al., "Internet Quarantine: Requirements for Containing Self-Propagating Code", In IEEE Societies Twenty-Second Annual Joint Conference of the IEEE Computer and Communications, vol. 3, Mar. 30-Apr. 3, 2003, pp. 1901-1910.

Naor, M. and Yung, M., "Universal One-Way Hash Functions and their Cryptographic Applications", In Proceedings of the 21st Annual ACM Symposium on Theory of Computing (STOC '89), Seattle, WA, USA, May 14-17, 1989, pp. 33-43.

Newsome, J., et al., "Polygraph: Automatically Generating Signatures for Polymorphic Worms", In Proceedings of the IEEE Symposium on Security and Privacy (S&P '05), Oakland, CA, USA, May 8-11, 2005, pp. 226-241.

Notice of Allowance dated Oct. 15, 2012 in U.S. Appl. No. 12/280,969.

Office Action dated Mar. 13, 2012 in U.S. Appl. No. 12/280,970.

Office Action dated Apr. 11, 2012 in U.S. Appl. No. 12/280,969.

Office Action dated Apr. 16, 2014 in U.S. Appl. No. 13/891,031.

Ramakrishna, M.V., et al., "A Performance Study of Hashing Functions for Hardware Applications", In Proceedings of the 6th International Conference on Computing and Information (ICCI '94), Peterborough, ON, CA, May 26-28, 1994, pp. 1621-1636.

Sekar, R., et al. "Specification-Based Anomaly Detection: A New Approach for Detecting Network Intrusions", In Proceedings of the

(56) References Cited

OTHER PUBLICATIONS

9th ACM Conference on Computer and Communications Security (CCS '02), Washington, DC, US, Nov. 18-22, 2002, pp. 265-274.
Sidiroglou, S., et al., "A Dynamic Mechanism for Recovering from Buffer Overflow Attacks", In Proceedings of the 8th Information Security Conference (ISC '05), Singapore, Sep. 20-23, 2005, pp. 1-15.
Sidiroglou, S., et al., "Building a Reactive Immune System for Software Services", In Proceedings of the 2005 USENIX Annual Technical Conference (USENIX '05), Anaheim, CA, USA, Apr. 10-15, 2005, pp. 149-161.
Singh, S., et al., "The EarlyBird System for Real-Time Detection of Unknown Worms", In ACM Workshop on Hot Topics in Networks, Cambridge, MA, USA, Nov. 20-21, 2003, pp. 1-6.
Staniford, S., et al., "How to Own the Internet in Your Spare Time", In Proceedings of the 11th USENIX Security Symposium, San Francisco, CA, USA, Aug. 5-9, 2002, pp. 149-167.
Szor, P. and Ferrie, P., "Hunting for Metamorphic", Technical Report, Symantec Corporation, Jun. 2003, pp. 1-23.
Tan K.M.C., et al., "Undermining an Anomaly-Based Intrusion Detection System Using Common Exploits", In Proceedings of the 5th International Conference on Recent Advances in Intrusion Detection (RAID '02), Zurich, CH, Oct. 16-18, 2002, pp. 54-73.
Tan, K.M.C. and Maxion, R.A., "'Why 6?' Defining the Operational Limits of Stide, and Anomaly-Based Intrusion Detector", In Proceedings of the IEEE Symposium on Security and Privacy (S&P '02), Berkeley, CA, USA, May 12-15, 2002, pp. 188-201.
U.S. Appl. No. 60/855,703, filed Oct. 30, 2006.

Vargiya, R. and Chan, P., "Boundary Detection in Tokenizing Network Application Payload for Anomaly Detection", Technical Report CS-2003-21, Department of Computer Sciences, Florida Institute of Technology, 2003, pp. 1-15.
Wagner, D. and Dean, D., "Intrusion Detection via Static Analysis", In Proceedings of the IEEE Symposium on Security and Privacy (S&P '99), Oakland, CA, USA, May 14-16, 2001, pp. 156-168.
Wagner, D. and Soto, P., "Mimicry Attacks on Host-Based Intrusion Detection Systems", In Proceedings of the Ninth ACM Conference on Computer and Communications Security (CCS '02), Washington, DC, USA, Nov. 18-22, 2002, pp. 255-264.
Wang, H.J., et al. "Shield: Vulnerability-Driven Network Filters for Preventing Known Vulnerability Exploits", In Proceedings of the 2004 Conference on Applications, Technologies, Architectures, and Protocols for Computer Communications (SIGCOMM '04), Portland, OR, USA, Aug. 30-Sep. 3, 2004, pp. 193-204.
Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.
Wang, K., et al., "Anomalous Payload-Based Worm Detection and Signature Generation", In Proceedings of the 8th International Symposium on Recent Advances in Intrusion Detection (RAID '05), Seattle, WA, USA, Sep. 7-9, 2005, pp. 227-246.
Wang, X., et al., "SigFree: A Signature-free Buffer Overflow Attack Blocker", In Proceedings of the 15th USENIX Security Symposium, Vancouver, BC, CA, Jul. 31-Aug. 4, 2006, pp. 225-240.
Written Opinion in International Patent Application No. PCT/US2007/05406, filed Feb. 28, 2007, mailed Mar. 31, 2008.
Written Opinion in International Patent Application No. PCT/US2007/05408, filed Feb. 28, 2007, mailed Mar. 6, 2008.

\* cited by examiner

SYSTEMS, METHODS, AND MEDIA FOR OUTPUTTING A DATASET BASED UPON ANOMALY DETECTION

CROSS-REFERENCE TO RELATED APPLICATIONS

This application is a continuation of U.S. patent application Ser. No. 12/280,969, filed Nov. 24, 2008, which is the U.S. National Phase Application Under 35 U.S.C. §371 of International Application No. PCT/US07/05408, filed Feb. 28, 2007, which claims the benefit of U.S. Provisional Patent Applications No. 60/778,008, filed Feb. 28, 2006, and U.S. Provisional Patent Application No. 60/790,626, filed Apr. 10, 2006. Each of the above-referenced patent applications is hereby incorporated by reference herein in its entirety.

STATEMENT REGARDING FEDERALLY SPONSORED RESEARCH OR DEVELOPMENT

This invention was made with government support under Grant No. ARO W911NF-04-1-0442 awarded by the Army Research Office (ARO). The government has certain rights in the invention.

TECHNICAL FIELD

The disclosed subject matter relates to systems, methods, and media for outputting a dataset based upon anomaly detection.

BACKGROUND

Network data traffic models can be used to show unique characteristics of specific network data traffic. These models can also be used for detecting network data traffic content anomalies, such as malicious code. This is because the characteristics of normal data traffic differ from the characteristics of data traffic harboring malicious code, such as viruses, worms, Trojan horses, spyware, and/or other data that can cause harmful effects. Some network content anomaly detectors that generate, train, and/or use such models can monitor and detect malicious code hidden in network traffic. However, they can still be vulnerable to mimicry attacks and training attacks.

A mimicry attack can be defined as a willful attempt to craft malicious code, or a package in which it is embedded, to look normal with respect to a network data traffic model associated with an anomaly detector, thereby managing to escape the detector's scrutiny. For example, an attacker can craft malicious code by padding the malicious code with a large amount of data bytes that can compose a normal distribution. For instance, one network worm designed to monitor a flow of byte streams into a network can craft an attack worm to appear normal to the detector that monitors the network. Because the network worm can monitor and learn the characteristics of the normal data flow into the network that may also be being used by the detector to train its data traffic models, the characteristics of the attack worm's composition may appear to be normal to the detector when the detector compares the characteristics of the attack worm to the characteristics of the normal network data traffic.

A training attack is an attack whereby an attacker sends a stream of data that deviates from the normal data incrementally or continuously to a target site in order to influence the site's content anomaly detector such that the detector would regard the attacker's malicious code as normal. A content anomaly detector can, and often does, use incoming data traffic to train its content anomaly detection model upon confirming that the data traffic does not cause harmful effects. An attacker can send a stream of data containing sparsely scattered bits and pieces of malicious code that does not cause immediate harms to a target site, but instead continuously trains that site's detector over a period of time to ignore the attack's threat.

SUMMARY

Systems, methods, and media for outputting a dataset based upon anomaly detection are provided. In some embodiments, methods for outputting a dataset based upon anomaly detection are provided. These methods: receive a training dataset having a plurality of n-grams, which plurality includes a first plurality of distinct training n-grams each being a first size; compute a first plurality of appearance frequencies, each for a corresponding one of the first plurality of distinct training n-grams; receive an input dataset including first input n-grams each being the first size; define a first window in the input dataset; identify as being first matching n-grams the first input n-grams in the first window that correspond to the first plurality of distinct training n-grams; compute a first anomaly detection score for the input dataset using the first matching n-grams and the first plurality of appearance frequencies; and output the input dataset based on the first anomaly detection score.

In some embodiments, methods for outputting a dataset based upon anomaly detection are provided. These methods: receive a training dataset having a plurality of n-grams, which plurality includes a first plurality of distinct training n-grams each being a first size; select the first plurality of distinct training n-grams on a random basis, pseudo-random basis, or secret basis; receive an input dataset including first input n-grams each being the first size; determine a first matching count of the first input n-grams that correspond to the first plurality of distinct training n-grams; determine a first total count of the first input n-grams; determine a first anomaly detection score using the first matching count and the first total count; and output the input dataset based on the first anomaly detection score.

In some embodiments, methods for outputting a dataset based upon anomaly detection are provided. These methods: receive a first training dataset having a plurality of n-grams, which plurality includes a first plurality of distinct training n-grams each being a first size; receive a second training dataset having a plurality of n-grams, which plurality includes a second plurality of distinct training n-grams each being the first size; compute a first plurality of appearance frequencies, each for a corresponding one of the first plurality of distinct training n-grams; compute a first plurality of uniformities of distribution, each for a corresponding one of the first plurality of distinct training n-grams; compute a second plurality of uniformities of distribution, each for a corresponding one of the second plurality of distinct training n-grams; determine a first plurality of most-heavily weighted n-grams from the first plurality of distinct training n-grams using at least one of: the first plurality of appearance frequencies; the first plurality of uniformities of distribution; and the second plurality of uniformities of distribution; select a subset of the first plurality of most-heavily weighted n-grams, wherein the subset includes m n-grams and at least one of the n-grams in the subset is outside of the top m of the first plurality of most-heavily weighted n-grams; receive an input dataset including first input n-grams each being the first size; obtain a subset of a second plurality of most-heavily weighted n-grams from the first input n-grams that correspond to the subset of the first plurality of distinct training n-grams; classify the input dataset as containing an anomaly using the subset of the first plurality of most-heavily weighted n-grams and the subset of the second plurality of most-heavily weighted n-grams; and output a dataset based upon the classifying of the input dataset.

In some embodiments, methods for constructing an anomaly detection model are provided. Theses methods: receive a training dataset having a plurality of n-grams, which plurality includes a first plurality of distinct training n-grams each being a first size; compute a first plurality of appearance frequencies, each for a corresponding one of the first plurality of distinct training n-grams; obtain a first pseudo count associated with the first plurality of appearance frequencies; compute a first total count of the plurality of n-grams that are each the first size; compute a first maximum possible count of distinct n-grams of the first size in the plurality of n-grams; compute a second total count of the first plurality of distinct training n-grams; compute a first smoothing factor; compute a first probability that the first plurality of distinct training n-grams are found in the training dataset using at least one of: the first plurality of appearance frequencies, the first pseudo count, the first total count, the second total count, and the first smoothing factor; compute a first consistency score of the plurality of n-grams that are each the first size using the first maximum possible count and the first probability; receive an input dataset including first input n-grams each being the first size; obtain a second consistency score of the first input n-grams; classify the input dataset using the first consistency score and the second consistency score; and output a dataset based upon the classifying of the input dataset.

In some embodiments, computer-readable media containing computer-executable instructions that, when executed by a processor, cause the processor to perform a method for outputting a dataset based upon anomaly detection, are provided. These methods: receive a training dataset having a plurality of n-grams, which plurality includes a first plurality of distinct training n-grams each being a first size; compute a first plurality of appearance frequencies, each for a corresponding one of the first plurality of distinct training n-grams; receive an input dataset including first input n-grams each being the first size; define a first window in the input dataset; identify as being first matching n-grams the first input n-grams in the first window that correspond to the first plurality of distinct training n-grams; compute a first anomaly detection score for the input dataset using the first matching n-grams and the first plurality of appearance frequencies; and output the input dataset based on the first anomaly detection score.

In some embodiments, computer-readable media containing computer-executable instructions that, when executed by a processor, cause the processor to perform a method for outputting a dataset based upon anomaly detection, are provided. These methods: receive a training dataset having a plurality of n-grams, which plurality includes a first plurality of distinct training n-grams each being a first size; select the first plurality of distinct training n-grams on a random basis, pseudo-random basis, or secret basis; receive an input dataset including first input n-grams each being the first size; determine a first matching count of the first input n-grams that correspond to the first plurality of distinct training n-grams; determine a first total count of the first input n-grams; determine a first anomaly detection score using the first matching count and the first total count; and output the input dataset based on the first anomaly detection score.

In some embodiments, computer-readable media containing computer-executable instructions that, when executed by a processor, cause the processor to perform a method for outputting a dataset based upon anomaly detection, are provided. These methods: receive a first training dataset having a plurality of n-grams, which plurality includes a first plurality of distinct training n-grams each being a first size; receive a second training dataset having a plurality of n-grams, which plurality includes a second plurality of distinct training n-grams each being the first size; compute a first plurality of appearance frequencies, each for a corresponding one of the first plurality of distinct training n-grams; compute a first plurality of uniformities of distribution, each for a corresponding one of the first plurality of distinct training n-grams; compute a second plurality of uniformities of distribution, each for a corresponding one of the second plurality of distinct training n-grams; determine a first plurality of most-heavily weighted n-grams from the first plurality of distinct training n-grams using at least one of: the first plurality of appearance frequencies; the first plurality of uniformities of distribution; and the second plurality of uniformities of distribution; select a subset of the first plurality of most-heavily weighted n-grams, wherein the subset includes m n-grams and at least one of the n-grams in the subset is outside of the top m of the first plurality of most-heavily weighted n-grams; receive an input dataset including first input n-grams each being the first size; obtain a subset of a second plurality of most-heavily weighted n-grams from the first input n-grams that correspond to the subset of the first plurality of distinct training n-grams; classify the input dataset as containing an anomaly using the subset of the first plurality of most-heavily weighted n-grams and the subset of the second plurality of most-heavily weighted n-grams; and output a dataset based upon the classifying of the input dataset.

In some embodiments, computer-readable media containing computer-executable instructions that, when executed by a processor, cause the processor to perform a method for outputting a dataset based upon anomaly detection, are provided. These methods: receive a training dataset having a plurality of n-grams, which plurality includes a first plurality of distinct training n-grams each being a first size; compute a first plurality of appearance frequencies, each for a corresponding one of the first plurality of distinct training n-grams; obtain a first pseudo count associated with the first plurality of appearance frequencies; compute a first total count of the plurality of n-grams that are each the first size; compute a first maximum possible count of distinct n-grams of the first size in the plurality of n-grams; compute a second total count of the first plurality of distinct training n-grams; compute a first smoothing factor; compute a first probability that the first plurality of distinct training n-grams are found in the training dataset using at least one of: the first plurality of appearance frequencies, the first pseudo count, the first total count, the second total count, and the first smoothing factor, compute a first consistency score of the plurality of n-grams that are each the first size using the first maximum possible count and the first probability; receive an input dataset including first input n-grams each being the first size; obtain a second consistency score of the first input n-grams; classify the input dataset using the first consistency score and the second consistency score; and output a dataset based upon the classifying of the input dataset.

In some embodiments, systems for outputting a dataset based upon anomaly detection are provided. These systems including a digital processing device that: receives a training dataset having a plurality of n-grams, which plurality includes a first plurality of distinct training n-grams each being a first size; computes a first plurality of appearance frequencies, each for a corresponding one of the first plurality of distinct training n-grams; receives an input dataset including first input n-grams each being the first size; defines a first window in the input dataset; identifies as being first matching n-grams the first input n-grams in the first window that correspond to the first plurality of distinct training n-grams; computes a first anomaly detection score for the input dataset using the first matching n-grams and the first plurality of appearance frequencies; and outputs the input dataset based on the first anomaly detection score.

In some embodiments, systems for outputting a dataset based upon anomaly detection are provided. These systems including a digital processing device that: receives a training dataset having a plurality of n-grams, which plurality includes a first plurality of distinct training n-grams each being a first size; selects the first plurality of distinct training n-grams on a random basis, pseudo-random basis, or secret basis; receives an input dataset including first input n-grams each being the first size; determines a first matching count of the first input n-grams that correspond to the first plurality of distinct training n-grams; determines a first total count of the first input n-grams; determines a first anomaly detection score using the first matching count and the first total count; and outputs the input dataset based on the first anomaly detection score.

In some embodiments, systems for outputting a dataset based upon anomaly detection are provided. These systems including a digital processing device that: receives a first training dataset having a plurality of n-grams, which plurality includes a first plurality of distinct training n-grams each being a first size; receives a second training dataset having a plurality of n-grams, which plurality includes a second plurality of distinct training n-grams each being the first size; compute a first plurality of appearance frequencies, each for a corresponding one of the first plurality of distinct training n-grams; computes a first plurality of uniformities of distribution, each for a corresponding one of the first plurality of distinct training n-grams; computes a second plurality of uniformities of distribution, each for a corresponding one of the second plurality of distinct training n-grams; determines a first plurality of most-heavily weighted n-grams from the first plurality of distinct training n-grams using at least one of: the first plurality of appearance frequencies; the first plurality of uniformities of distribution; and the second plurality of uniformities of distribution; selects a subset of the first plurality of most-heavily weighted n-grams, wherein the subset includes m n-grams and at least one of the n-grams in the subset is outside of the top m of the first plurality of most-heavily weighted n-grams; receives an input dataset including first input n-grams each being the first size; obtains a subset of a second plurality of most-heavily weighted n-grams from the first input n-grams that correspond to the subset of the first plurality of distinct training n-grams; classifies the input dataset as containing an anomaly using the subset of the first plurality of most-heavily weighted n-grams and the subset of the second plurality of most-heavily weighted n-grams; and outputs a dataset based upon the classifying of the input dataset.

In some embodiments, systems for constructing an anomaly detection model are provided. These systems including a digital processing device that: receives a training dataset having a plurality of n-grams, which plurality includes a first plurality of distinct training n-grams each being a first size; computes a first plurality of appearance frequencies, each for a corresponding one of the first plurality of distinct training n-grams; obtains a first pseudo count associated with the first plurality of appearance frequencies; computes a first total count of the plurality of n-grams that are each the first size; computes a first maximum possible count of distinct n-grams of the first size in the plurality of n-grams; computes a second total count of the first plurality of distinct training n-grams; computes a first smoothing factor; computes a first probability that the first plurality of distinct training n-grams are found in the training dataset using at least one of the first plurality of appearance frequencies, the first pseudo count, the first total count, the second total count, and the first smoothing factor; computes a first consistency score of the plurality of n-grams that are each the first size using the first maximum possible count and the first probability; receives an input dataset including first input n-grams each being the first size; obtain a second consistency score of the first input n-grams; classifies the input dataset using the first consistency score and the second consistency score; and outputs a dataset based upon the classifying of the input dataset.

DETAILED DESCRIPTION

Figure 1:
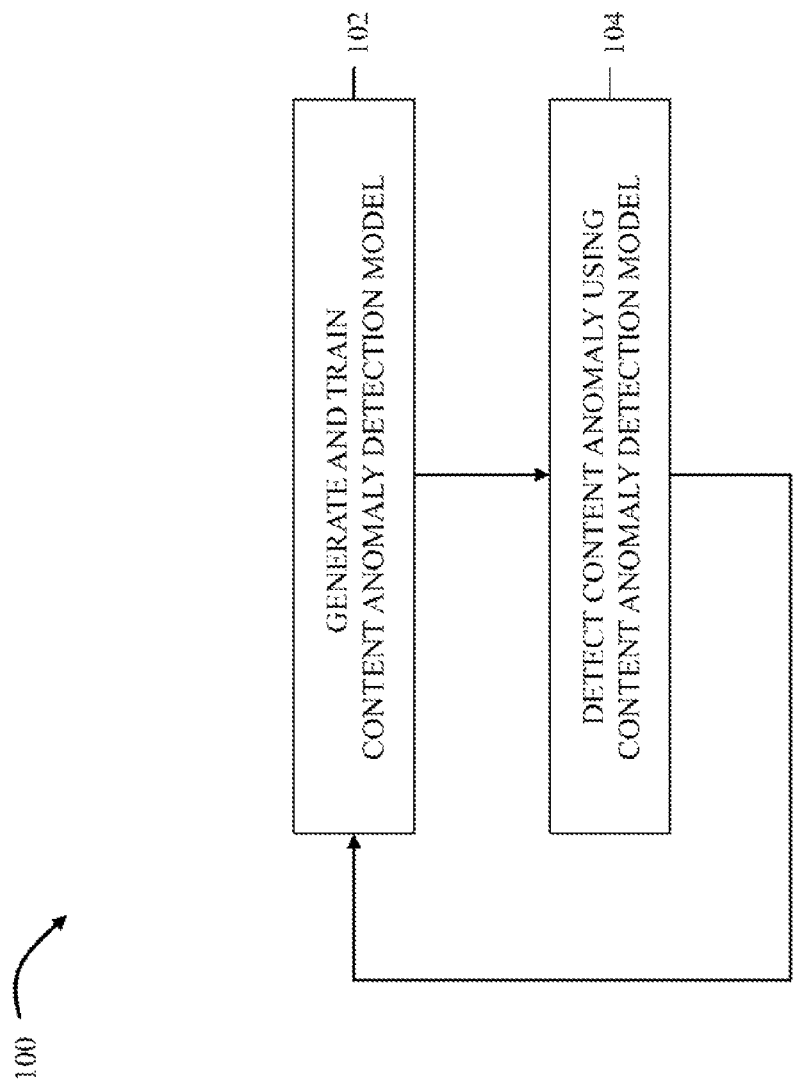
FIG. 1 is a simple illustration of a method for detecting content anomalies in accordance with some embodiments of the disclosed subject matter.

Systems, methods, and media for outputting a dataset based upon anomaly detection are provided. In some embodiments of the disclosed subject matter, systems, methods, and media are provided for generating and/or training frequency distribution-based content anomaly detection models that use a mixture of higher order n-grams.

Frequency distribution-based content anomaly detection models are models that represent the frequency distribution of the distinct n-grams generated from training datasets.

An n-gram is a sequence of a number of consecutive tokens in a stream of tokens, such as one or more bytes, strings, characters, or other suitable symbols and units of different types or definitions. For example, a 2-gram in bytes is a sequence of two bytes in a stream of bytes. A higher order n-gram is an n-gram of size greater than a first order n-gram (i.e., 1-gram), such as a fifth order n-gram (i.e., 5-gram). A mixture of higher order n-grams is a group of higher order n-gram of different sizes, such as a group of 3-grams, 5-grams, and 9-grams.

Using a mixture of higher order n-grams in frequency distribution-based content anomaly models is beneficial because it can capture the continuity between continuous bytes and contain more content information than a first order n-gram model, or even a fixed higher order n-gram model.

In some embodiments of the disclosed subject matter, systems, methods, and media are provided for generating and/or training network data traffic models using randomization processes. The randomization processes can help thwart malicious efforts in crafting mimicry attacks because the information that is crucial to attackers is kept secret. For example, when one or more randomly selected parts of the payload of a network data packet are used for modeling the packet instead of using the whole packet payload, it is harder for an attacker to craft a malicious worm. For instance, in such cases, the attacker does not know where and how to pad the worm's content to evade detection even if the attacker can monitor and learn the full knowledge of the content flow.

In some embodiments of the disclosed subject matter, systems, methods, and media are provided for generating and/or training binary-based content anomaly detection models. A binary-based content anomaly detection model is based on the presence and/or absence of each of distinct n-grams in a training dataset. The model can be referenced during a detecting or testing phase to detect the payload of a data packet containing one or more never-before-seen n-grams, which are likely to contain malicious code.

In some embodiments of the disclosed subject matter, systems, methods, and media are provided for computing a content anomaly detection score. A content anomaly detection score can be used to measure the likelihood of a dataset containing malicious code. It can also measure the likelihood of a dataset containing no malicious code. The score can be computed, for example, by counting the occurrences of never-before-seen n-grams in a dataset and dividing the count by the total number of n-grams in the dataset. Based on the score (for instance, if the score were high), a decision to examine the dataset further, rather than processing requests in the dataset, can be made.

FIG. 1 is a simple illustration of a method 100 for detecting content anomalies. As shown at 102, a content anomaly detection model is generated and trained. In some embodiments, a frequency distribution-based detection model can be generated and trained, for example, as described below in connection with part 201 of FIG. 2 and FIG. 4. In some embodiments, a binary-based detection model can be generated and trained, for example, as described below in connection with part 301 of FIG. 3 and FIG. 6.

At 104, the content anomaly detection model is used to detect content anomalies. In some embodiment, a frequency distribution-based anomaly detection model is used to detect content anomalies, for example, as described below in connection with part 203 of FIG. 2 and FIG. 5. In some embodiments, a binary-based anomaly detection model is used to detect content anomalies, for example, as described in connection with part 303 of FIG. 3.

Figure 2:
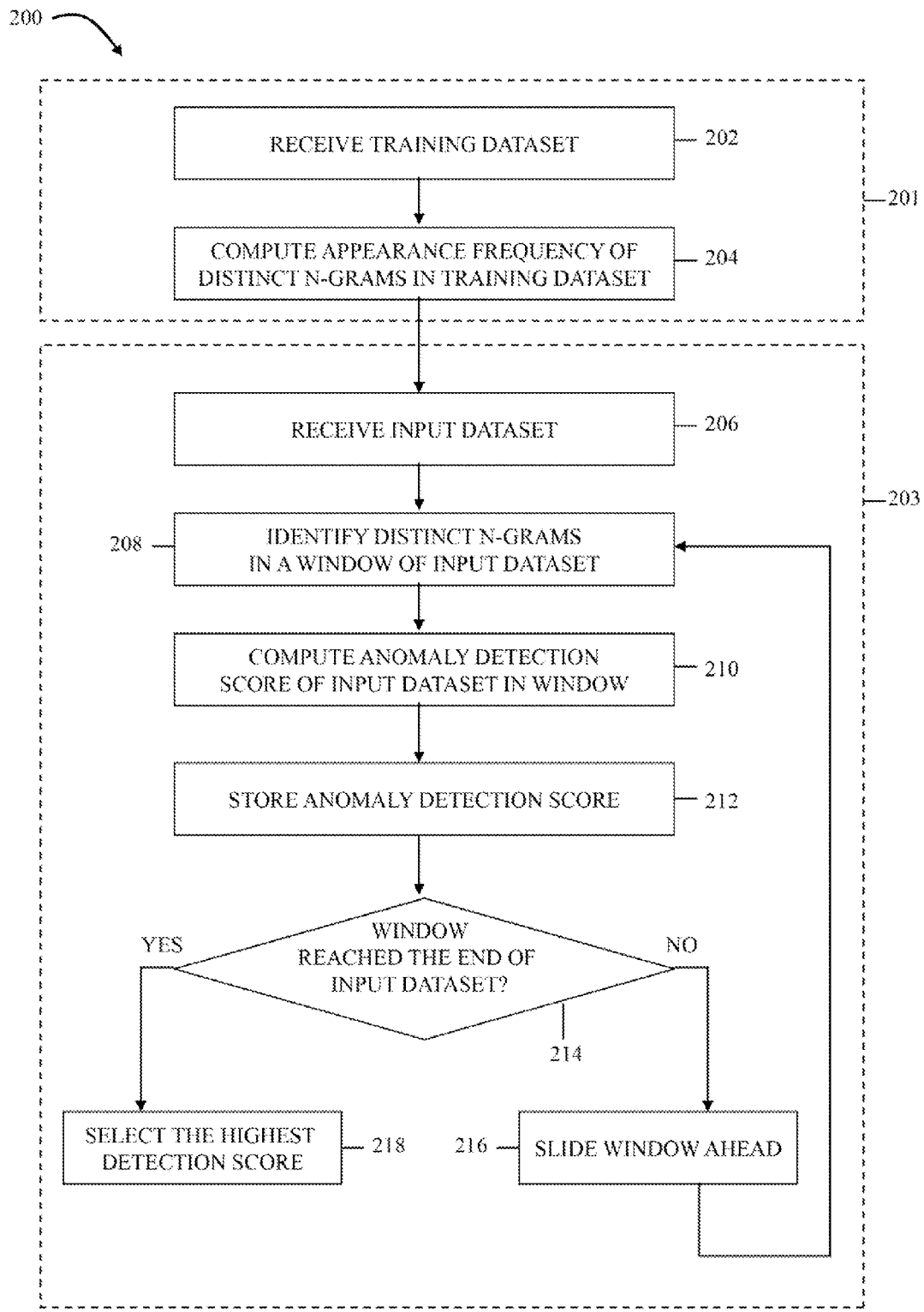
FIG. 2 is a simple illustration of a method for generating, training, and applying a frequency distribution-based anomaly detection model in accordance with some embodiments of the disclosed subject matter.

FIG. 2 is a simple illustration of a method 200 for generating, training, and applying a frequency distribution-based anomaly detection model in accordance with some embodiments. At 202, a training dataset is received. In some embodiments, the training dataset can include one or more network data packets or data frames. In some embodiments, the training dataset can include one or more files that contain various types of data, such as text, graphic images, sound samples, video samples, computer-executable codes, other suitable types of data, and/or one or more combinations thereof. In some embodiments, the training dataset can also include a stream of data in bytes or a stream of tokens in one or more communication sessions.

In some embodiments, before it is used for training anomaly detection models, the training dataset can be checked to ascertain its validity to ward off a potential training attack. Such a validation effort can also help avoid inadvertently immunizing one or more instances of malicious code from being detected. For example, a training dataset can be processed to determine whether it harbors any data that produces erroneous or otherwise unusual or invalid outcomes. Suppose, for instance, that the training dataset includes a Portable Document Format (PDF) file. The PDF file can be opened using an instance of an Adobe® Acrobat Reader running in a sandbox while the sandbox is being monitored. By opening the file in the sandbox while monitoring the state of the sandbox, for instance, the server can determine whether the PDF file contains malicious code.

At 204, an appearance frequency of each of distinct n-grams contained in the training dataset is computed. In some embodiments, for example, each of the distinct n-grams is saved in a data structure, such as a Bloom filter or a hash table, when it is observed for the first time and a counter associated with that n-gram is incremented for each observation of the n-gram.

A Bloom filter can be defined as a bit array of m bits, wherein an individual bit j is set to 1 if the hash of an input value (e.g., input value mod n) is j. It acts as a one-way data structure that can contain many items within a storage capacity that is orders-of-magnitude smaller than the maximum dimension of the stored items.

As the order of n-grams increases, the memory capacity necessary to handle higher order n-grams increases exponentially. For example, fifth order grams (i.e., 5-grams) of bytes can take $256^5$, or 1024 billion, different combinations of byte values.

A Bloom filter may contain false positives if a collision occurs while performing a check operation. Collisions may occur because two distinct inputs into a hash function may produce identical outputs. Suppose, for example, there are two distinct n-grams, A (which occurs in the training dataset only) and B (which occurs in the input dataset only), which both produce the same hash value. Because A is in the training dataset, the Bloom filter contains a bit set for A. If the Bloom filter is checked for B, however, because B hashes to the same value, then B can be mistakenly believed to be represented in the Bloom filter. This is a false positive.

In some embodiments, a grouped n-gram can be used to alleviate such memory capacity requirements by treating one group of n-grams as one n-gram by defining the one n-gram as not considering the order of the characters therein. For example, a group of 3-grams, such as abc, acb, bac, bca, cab, and cba, can be grouped into one representative 3-gram, such as abc. As can be seen, a grouped n-gram can save memory usage. For example, the size of 5-grouped-grams in bytes is 120 times smaller than 1024 billion.

Grouping n-grams can also help reduce potential false positive detections. For example, in HTTP requests, often there are long "Range" attributes, such as:

Range: bytes=2056143-2057186, 2056141-2056142, 2057187-2059870, 2080621-2082690, . . .

Such requests can be detected because, even though the exact digit sequences being checked may never appear in a training dataset, sequences in the same range as the digit sequences do appear during the training phase. Thus, using grouped n-grams can reduce false positive detections because the never-appearing digit sequence will not be considered to be anomalous.

At 206, an input dataset is received. Like the training dataset, the input dataset can be network data packets or frames, files containing data in variety of types and formats, or a stream of bytes or tokens of different lengths. In some embodiments, the input dataset is a test dataset that is designed to measure how well a content anomaly detection model is trained. In some embodiments, the input dataset is a stream of incoming bytes that should be scrutinized before reaching its destination.

At 208, a window is applied to the input dataset and a set of distinct n-grams within the window is identified. Some types of malicious attacks hide malicious code inside a data packet having large amount of normal data. Using a window can help capture such malicious code. In some embodiments, the window is a sliding window.

At 210, an anomaly detection score of the input dataset in the window is computed using the set of distinct n-grams and the appearance frequency of each distinct n-gram in the set. In some embodiments, the anomaly detection score is computed using the following formula:

$$\text{Detection Score} = \frac{\sum_i f(g_i)}{T_{n\text{-}grams}},$$

where $g_i$ is a distinct n-gram contained in an input dataset, $f(g_i)$ is an appearance frequency of the distinct n-gram, $g_i$, computed during the training phase, and $T_{n\text{-}grams}$ is the total number of n-grams in the input dataset.

At 212, the anomaly detection score is stored. In some embodiments, a data structure, such as an array, a list, or any other suitable data structure that can hold multiple elements, is used to store the score. For example, the detection score can be stored in a list.

At 214, it is determined whether the window has reached the end of the input dataset. In some embodiments, the size of the window is less than the size of the input dataset and, therefore, the end of the input dataset can be reached after sliding the window ahead, at 216, a number of times. If it has been determined at 214 that the window has not reached the end of the input dataset, the window is slid ahead at 216 and 208, 210, 212, 214, and 216 or 218 are repeated. In some embodiments, the window is slid ahead by one token space or data unit. For example, the window can be slid ahead by one byte. In some embodiments, the window is slid ahead by multiple token spaces or data units.

If it is determined at 214 that the window has reached the end of the input dataset, however, the highest detection score can be selected at 218 from the computed anomaly detection scores. A higher score may be selected because a higher score may indicate that the input dataset is normal. This is because high scores indicate that more n-grams that have been observed during the training phase are also in the input dataset.

In some embodiments, the anomaly detection scores can be sorted using a sorting algorithm. In some embodiments, for example, the highest score can be kept at the beginning of a list. Whenever a new anomaly detection score is computed, it can be compared with the highest score thus far. If the new score is greater, the new score is added at the beginning of the list. Otherwise, the new score is added at the end of the list. In this way, the highest detection score can be easily located.

Figure 3:
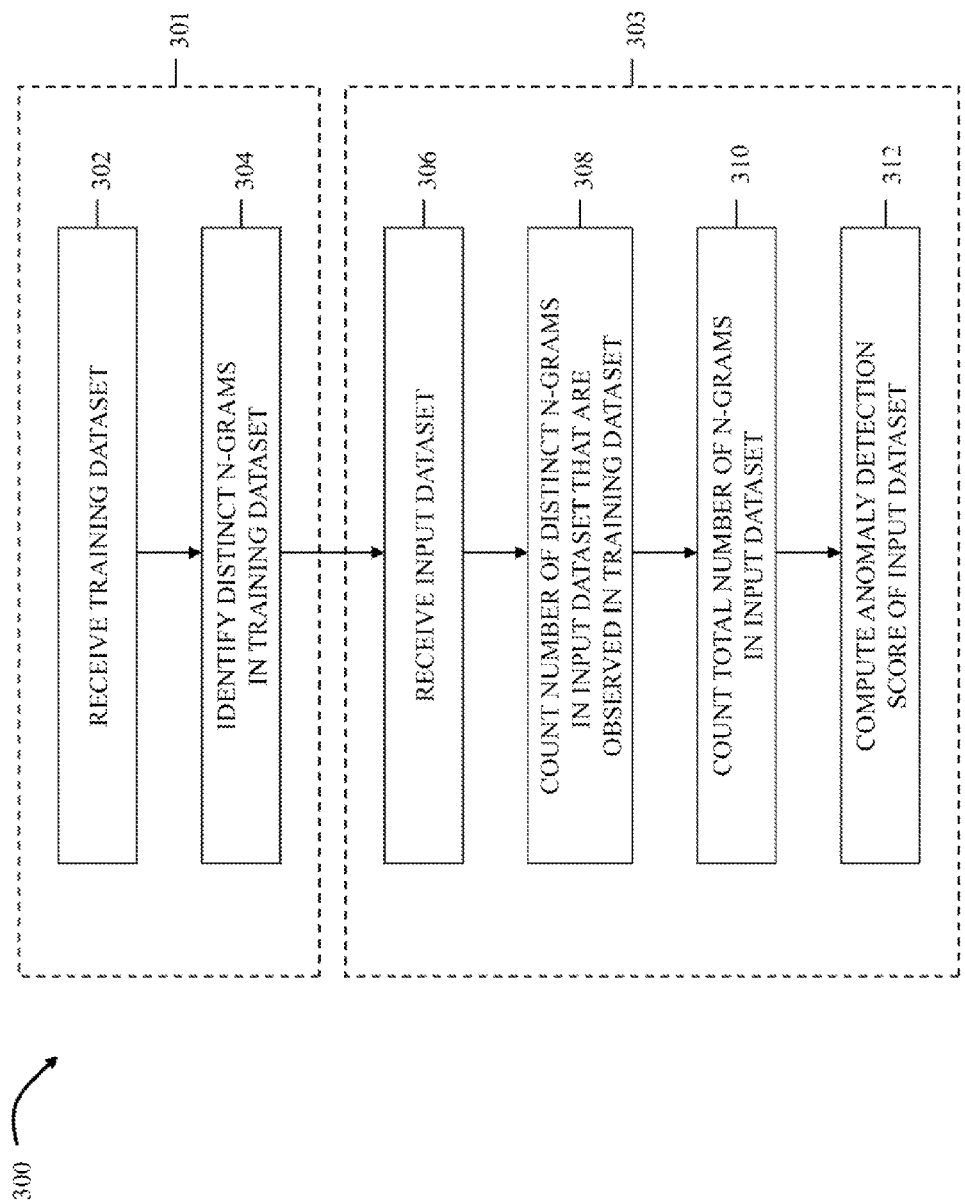
FIG. 3 is a simple illustration of a method for generating, training, and applying a binary-based anomaly detection model in accordance with some embodiments of the disclosed subject matter.

FIG. 3 is a simple illustration of another method 300 for generating, training, and applying a binary-based anomaly detection model in accordance with some embodiments. As shown, at 302, a training dataset is received. As in 202, the training dataset can be network data packets or frames, files containing data in variety of types and formats, or a stream of bytes or tokens of different lengths. Also, as in 202, the training dataset can be checked to ascertain its validity before it is used to ward off a potential training attack, or to help avoid inadvertent immunizations of one or more instances of malicious code from detection.

At 304, a set of distinct n-grams in the training dataset is identified. In some embodiments, the distinct n-grams are stored in a data structure, such as a Bloom filter.

In order to address this collision issue, in some embodiments, a Bloom filter can be configured to have multiple hash functions. By requiring all of the multiple hash functions to be set for verifying the presence of each item in the Bloom filter, the false positive rate can be reduced.

At 306, an input dataset is received. As in 206, the input dataset can be network data packets or frames, files containing data in a variety of types and formats, a stream of bytes or tokens of different lengths, and/or other suitable dataset. Also, as in 206, the input dataset can be a test dataset that is designed to measure how well a content anomaly detection model is trained, or a stream of incoming bytes that should be scrutinized before reaching its destinations.

At 308, the number of distinct n-grams identified in the input dataset that are also contained in the training dataset are counted. In some embodiments, the distinct n-grams contained in the training dataset are stored in a Bloom filter. In some embodiments, for example, when a distinct n-gram contained in the input dataset is observed for the first time, the distinct n-gram is hashed to verify its presence in the Bloom filter using one or more hash functions. If the hash function(s) verify the presence of the distinct n-gram in the Bloom filter, then a counter associated with the input dataset is incremented.

At 310, the total number of n-grams contained in the input dataset is counted. In some embodiments, a counter is incremented each time an n-gram contained in the input dataset is observed regardless of whether it has been observed already, or whether it has been previously observed during the training phase. In some embodiments, 308 and 310 can be performed at the same time.

At 312, an anomaly detection score of the input dataset is computed using the number of distinct n-grams identified in the input dataset that are also contained in the training dataset and the total number of n-grams contained in the input dataset. In some embodiments, the anomaly detection score is computed using the following formula:

$$\text{Detection Score} = \frac{T_d}{T_i},$$

where $T_d$ is the number of distinct n-grams identified in the training dataset that are also contained in the input dataset and $T_t$ is the total number of n-grams contained in the input dataset.

Figure 4:
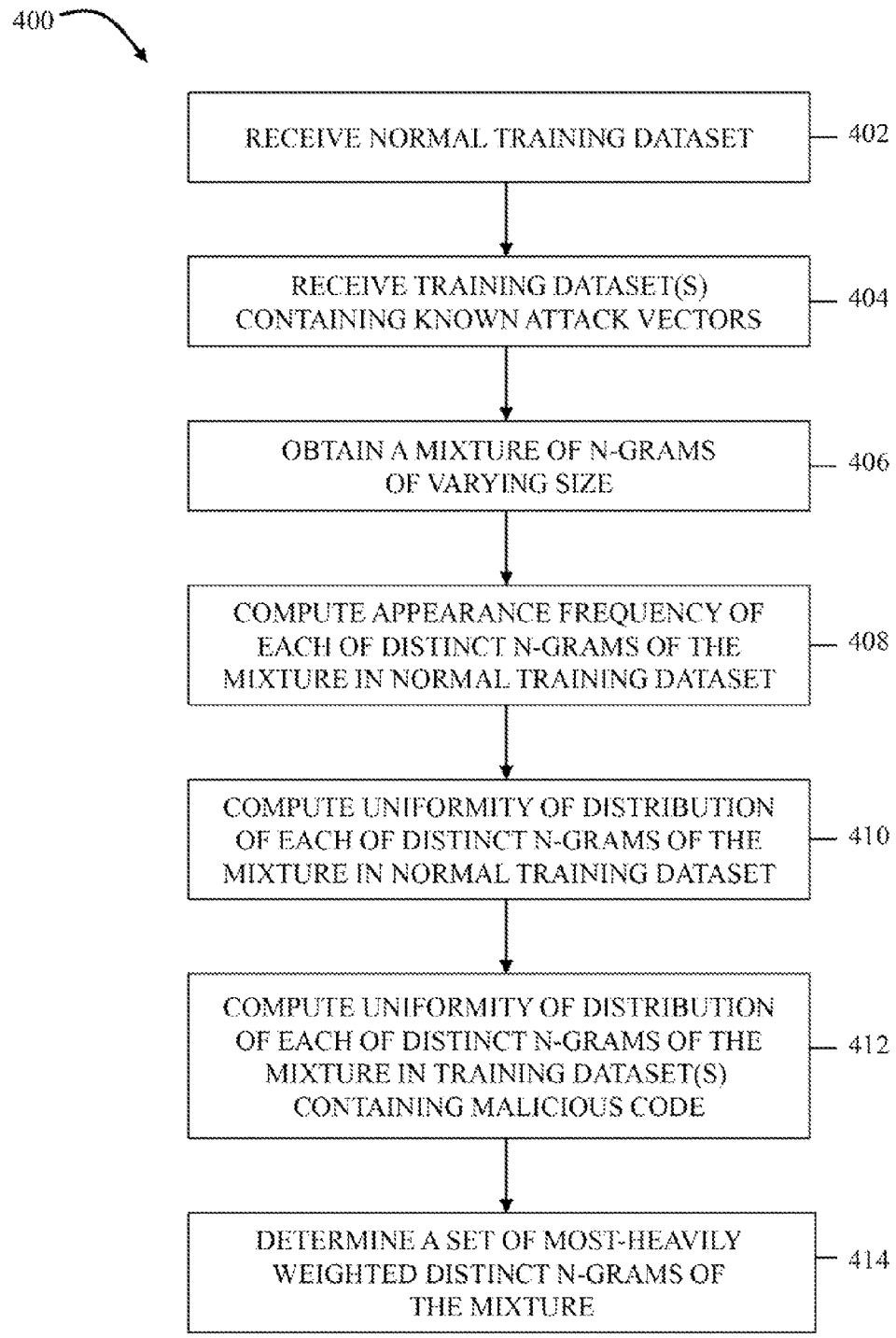
FIG. 4 is a simple illustration of a method for training a frequency distribution-based anomaly detection model in accordance with some embodiments of the disclosed subject matter.

FIG. 4 is a simple illustration of a method 400 for generating and training a frequency distribution-based anomaly detection model in accordance with some embodiments. At 402, a normal training dataset is received. As in 202, the normal training dataset can be network data packets or frames, files containing data in a variety of types and formats, or a stream of bytes or tokens of different lengths. Also, as in 202, the normal training dataset can be checked to ascertain its validity before it is used to ward off a potential training attack, or to help avoid inadvertent immunizations of one or more instances of malicious code from detections.

In some embodiments, the normal training dataset is randomly partitioned into several parts in order to make crafting malicious code even more difficult. In some embodiments, a random or secret combination of these parts can be used to produce a distinct anomaly detection model. By using this random or secret combination of parts, attackers will be unable to know precisely which parts of the input dataset they should pad cause it to appear normal.

In some embodiments, partitions of the training datasets and input datasets can be chosen so that each partition has a minimum size. For example, in some embodiments, a random binary mask can be used to generate random partitions, where each bit defines whether a corresponding partition is to be used (1) or not (0). In some embodiments, a string of contiguous 0's and 1's in the random binary mask is made to be at least m bits long (or another suitable size). For instance, any contiguous string in a random binary mask can be made to be at least 10 bits. Additionally or alternatively, in some embodiments, the number of partitions that are used can be similar or equal in size to the number of partitions that are not used. Thus, in the binary mask example above, the length of strings of contiguous 0's may be chosen to closely match the length of strings of contiguous 1's.

At 404, one or more training datasets containing known instances of malicious code are received. In some embodiments, such instances of malicious code can be captured from prior attacks. Such prior attacks can be mimicry attacks, training attacks, and/or combinations thereof. As in 202, the training dataset(s) containing malicious code can be network data packets or frames, files containing data in a variety of types and formats, a stream of bytes or tokens of different lengths, and/or various other suitable datasets.

In some embodiments, as in 402, the training dataset(s) containing malicious code are randomly partitioned into several parts that can be identified more closely with one or more particular types of malicious code. In some embodiments, each of the training datasets includes one or more particular types of malicious code.

At 406, a mixture of n-grams of different sizes is obtained. In some embodiments, a particular mixture of n-grams is kept secret to thwart mimicry attacks. If, for instance, an attacker does not know the mixture of different sizes of n-grams being used by a content anomaly detector, the attacker would not know how to hide malicious code to avoid detection.

In some embodiments, furthermore, one or more n-grams in the mixture are randomly chosen from a pool of n-grams of different sizes and, therefore, the content of the secret mixture is known only to a content anomaly detector that is used to train content anomaly detection models and detect anomalies using those models. For example, a mixture of n-grams containing 2-grams, 3-grams, 7-grams, and 9-grams can be randomly chosen and used to serve as the core data for training detection models.

At 408, an appearance frequency of each distinct n-gram of a mixture of n-grams of randomly chosen sizes in the normal training dataset is computed. For example, for a mixture of randomly chosen n-grams consisting of 2-grams, 4-grams, and 5-grams, the appearance frequency of each distinct 2-gram, 4-gram, and 5-gram can be computed, respectively. In some embodiments, for example, the appearance frequency is computed via the following formula:

$$F(i) = \log\left(\frac{x_i}{N_t}\right),$$

where $x_i$ is the count of each unique n-gram i, $N_t$ is the number of types of data (e.g., normal data, data containing malicious code, etc.), and $F(i)$ is a measurement of an appearance frequency of each n-gram i.

At 410, the uniformity of distribution of each distinct n-gram in a group of n-grams in the normal training dataset, or a group of its parts, is computed. This is a measure of the entropy of the distinct n-gram. The uniformity of distribution can be used to find those unique n-grams that frequently appear across the normal training dataset or a group of its pans. In some embodiments, the uniformity of distribution is computed via the following formula:

$$U(i) = \frac{1}{\log(N_i)} \sum_i P_i \log\left(\frac{1}{P_i}\right),$$

where $P_i$ is a probability that n-gram i appears in the normal training dataset, $N_i$ is an appearance frequency of the n-gram i, and $U(i)$ is a term that measures the uniformity of distribution of the n-gram i in the normal training dataset.

At 412, the uniformity of distribution of each distinct n-gram of a mixture of n-grams in the training dataset(s) containing malicious code is computed. The uniformity of distribution can measure how uniformly distributed each unique n-gram is across the training dataset(s). In some embodiments, uniformity of distribution can be computed proportionally to the inverse of the uniformity of distribution of the unique n-gram across the training dataset(s) and, therefore, those unique n-grams that appear more uniformly across the training dataset(s) are given less weight. In some embodiments, the term is computed via the following formula:

$$A(i) = 1 - \left(\frac{1}{\log(L)} \sum_i P_{ij} \log\left(\frac{1}{P_{ij}}\right)\right),$$

where $P_{ij}$ is a probability that a unique n-gram t appears in a training dataset of type j, L is the number of different types of training dataset(s), and $A(i)$ is a term that measures the uniformity of distribution of the n-gram i in one or more training datasets containing malicious code.

At 414, a set of the most-heavily-weighted distinct n-grams of any size is determined. In some embodiments, the weight of each distinct n-gram in a group of n-grams in the training datasets is computed. For example, the weight can be computed via the following formula:

$$W(i)=F(i)*U(i)*A^d(i),$$

where d is an exponent designed to adjust A(i) to produce diminishing returns with scaling to large numbers of training datasets of different types. In some embodiments, a predetermined number of distinct n-grams of any size having the most-heavy weights is selected. For example, a set of M most-heavily weighted n-grams of any size can be selected. In some embodiments, d can be 3 or 5.

Figure 5:
FIG. 5 is a simple illustration of a method for classifying an input dataset using a trained anomaly detection model in accordance with some embodiments of the disclosed subject matter.

FIG. 5 is a simple illustration of a method 500 for classifying an input dataset using a content anomaly detection model that has been trained using method 400 in accordance with some embodiments. As shown, at 502, an input dataset is received. As in 206, the input dataset can be network data packets or frames, files containing data in a variety of types and formats, or a stream of bytes or tokens of different lengths. Also, as in 206, the input dataset can be a test dataset that is designed to measure how well a content anomaly detection model is trained, or a stream of incoming bytes that should be scrutinized before reaching its destinations.

At 504, as in 408, an appearance frequency of each of distinct n-grams contained in the input dataset is computed. In some embodiments, as in 408, an appearance frequency of each of distinct n-grams in a group of randomly chosen n-grams in the input dataset is computed. At 506, as in 410, the uniformity of distribution of each distinct n-gram in a group of n-grams in the input dataset is computed.

At 508, as in 414, a set of the most-heavily weighted distinct n-grams of any size is determined. In some embodiments, as in 414, the weight of each distinct n-grams in a group of n-grams in the input dataset is computed and a predetermined number of distinct n-grams having the most weights is selected.

At 510, the input dataset is classified using the most-heavily weighted distinct n-grams contained in the input dataset and the most-heavily weighted distinct n-grams contained in the training dataset. For example, the most-heavily weighted distinct n-grams contained in the training dataset can be used to determine a threshold value. In some embodiments, the sum of the weights of the selected distinct n-grams is computed and tested against the threshold value. In some embodiments, the input dataset is classified as normal if the sum of the weights is greater than the threshold value. In some embodiments, the threshold value is adjustable.

Figure 6:
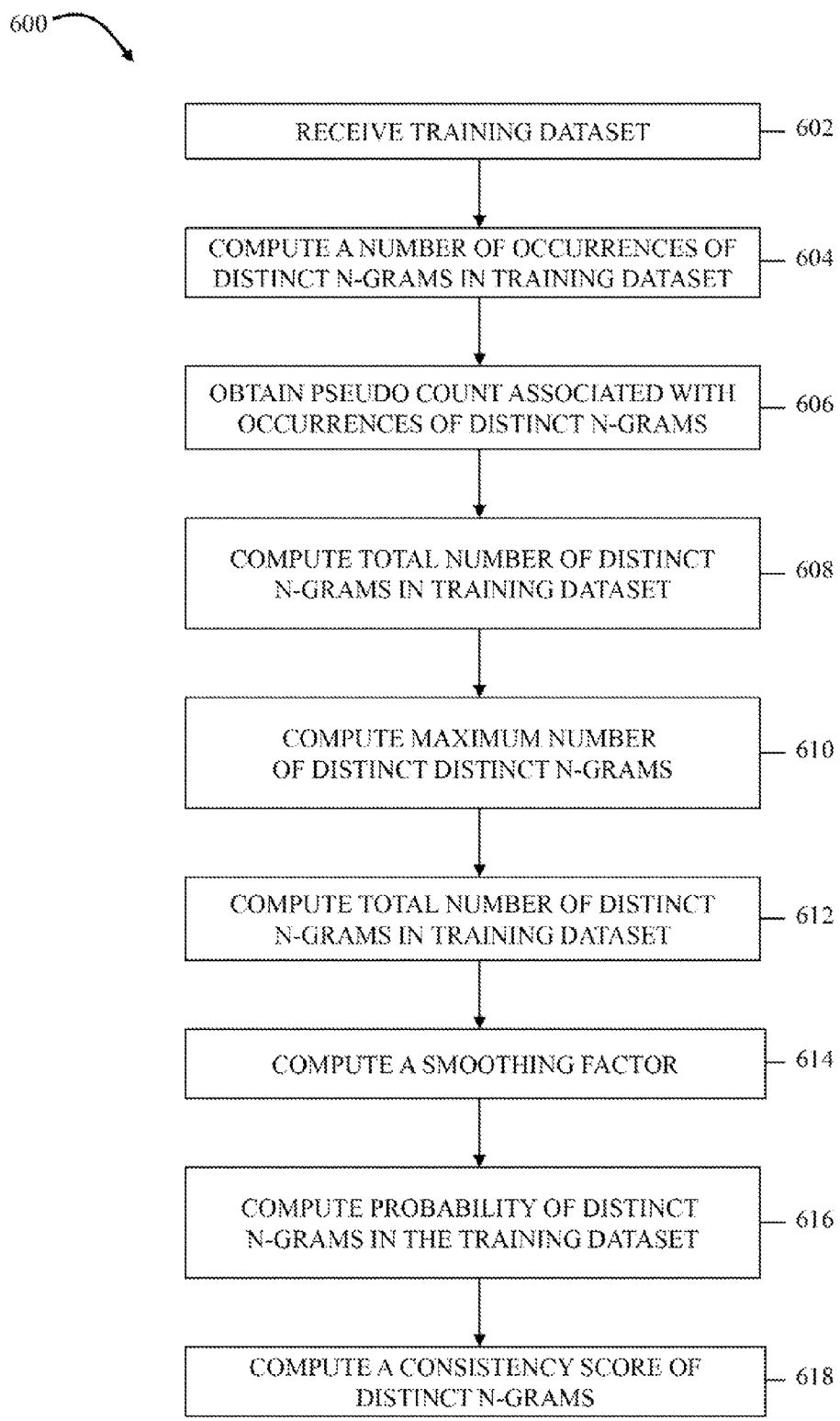
FIG. 6 is a simple illustration of a method for training a binary-based probabilistic anomaly detection model in accordance with some embodiments of the disclosed subject matter.

FIG. 6 is a simple illustration of a method 600 for generating and training a binary-based probabilistic anomaly detection model in accordance with some embodiments. As shown, at 602, a training dataset is received. As in 202, the training dataset can be network data packets or frames, files containing data in a variety of types and formats, or a stream of bytes or tokens of different lengths. Also, as in 202, the training dataset can be checked to ascertain its validity before it is used to ward off a potential training attack, or to help avoid inadvertent immunizations of one or more malicious code from detections.

In some embodiments, the training dataset is a set of the most-frequently occurring n-grams of any size that have been observed during previous trainings by monitoring and recording a content flow within a network environment. For example, n-grams of size 1-10 can be used to determine the 1,000 most-frequently occurring n-grams of any size from 1-10 to generate the training dataset. In some embodiments, the training dataset comprises only the most-frequently occurring n-grams that are extracted from data packets that are free of processing errors. This can help avoid including packets that contain previously seen malicious code, to which servers are no longer vulnerable, in the training dataset.

At 604, the number of occurrences of distinct n-grams of different sizes in the training dataset is computed. For example, the number of previous occurrences of 2-grams, 3-grams, and 5-grams in the training dataset can be computed by counting every 2-gram, 3-gram, and 5-gram that is contained in the training dataset, respectively.

At 606, a pseudo count associated with the number of occurrences of each type of n-gram is obtained to give some probability mass to each possible n-gram of each type that may be observed. In some embodiments, the pseudo count is predetermined and fixed. In some embodiments, it can be adjusted by users. For example, a pseudo count associated with the number of occurrences of 2-grams, 3-grams, and 5-grams, respectively, may be obtained from a user. In some embodiments, the pseudo count may be set equal to one.

At 608, a total number of each type of n-gram in the training dataset is computed. In some embodiments, for example, the total number of 2-grams, 3-grams, and 5-grams in the training dataset is counted, respectively, using three separate counters.

At 610, the maximum number of distinct n-grams in the training dataset is computed. For 5-grams in bytes, for instance, the maximum number of distinct 5-grams is 256 to the fifth power, or 1024 billion, which can be a rather large number with respect to memory and processor usages. In some embodiments, therefore, the maximum number of distinct n-grams can be adjusted. For example, 5-grams from a mixture of n-grams of size 1-10 that are not chosen as the top most-frequently occurring grams are counted. The count is then added to the number of 5-grams chosen as part of the top-most-frequently occurring grams to generate an adjusted maximum number of distinct 5-grams in lieu of 1024 billion.

At 612, the total number of distinct n-grams of each type in the training dataset can be computed. For example, every distinct 2-gram, 3-gram, and 5-gram in the training dataset can be counted, respectively, using three separate counters.

At 614, a smoothing factor that estimates the likelihood of observing a previously unseen n-gram is computed. In some embodiments, the factor is computed via the following formula:

$$C = \frac{N}{N+L-k_0},$$

where C is a smoothing factor, N is the total number of a given type of n-gram in the training dataset, L is the maximum number of distinct n-grams in the training dataset, and $k_0$ is the number of distinct n-grams in the training dataset.

In some embodiments, the smoothing factor is adjusted when L is too large. For example, the smoothing factor can be dominated by L if L is too large. In some embodiments, therefore, the smoothing factor is computed via the following formula:

$$C = \frac{N}{N+\beta},$$

where $\beta$ is a constant value. In some embodiments, $\beta$ can be chosen by users. In some embodiments, $\beta$ is set to the value of $k_0$ when $k_0$ is approximately equal to N.

At 616, the probability that each type of n-grams will be found in the training dataset is computed. In some embodiments, if n-gram of type i has been previously observed, the probability is computed via the following formula:

$$P(i) = \frac{\alpha + N_i}{\kappa_{ij}\alpha + N} C,$$

where $\alpha$ is a smoothing factor, $N_i$ is the number of occurrences of i-gram (i.e., n-gram of size i), $K_0$ is the number of distinct n-grams in the training dataset, N is the total number of a given type of n-gram in the training dataset, C is a smoothing factor, and P(i) is a probability that i-grams are fond in the training dataset.

In some embodiments, if an n-gram of type i has not been observed, the probability is computed via the following formula:

$$P(i) = \frac{1}{L - \kappa_0}(1 - C),$$

where L is the maximum number of distinct n-grains in the training dataset.

At 618, a consistency score of n-grams of different sizes is computed, respectively. In some embodiments, the consistency score is computed via the following formula:

Consistency Score=Log($P_i$)+Log($L$), where $P_i$ is a probability that i-grams are fond in the training dataset and L is the maximum number of distinct i-grams in the training dataset.

In some embodiments, the order in which the different size grams are processed is taken into consideration for various optimizations. For example, processing the largest grams first may provide for storage optimization. This may be the case because, if the set of the largest grams is stored in a tree, for instance, a data structure can provide the means of representing information about the smaller grams without having to generate a separate data structure for each of the different size grams.

In some embodiments, a content anomaly detector using a detection model generated using method 600 is used to classify an input dataset. Given a set of consistency scores for different sizes of n-grams in a training dataset, for example, the content anomaly detector can extract different sizes of n-grams from the input dataset, compute a consistency score for each of the extracted n-grams, and classify the input data using the scores. In some embodiments, for example, the input dataset is regarded as abnormal if a sum of the consistency score of one or more extracted n-grams falls below a threshold value. In some embodiments, the threshold value is determined using the set of consistency scores for different sizes of n-grams in a training dataset.

Figure 7:
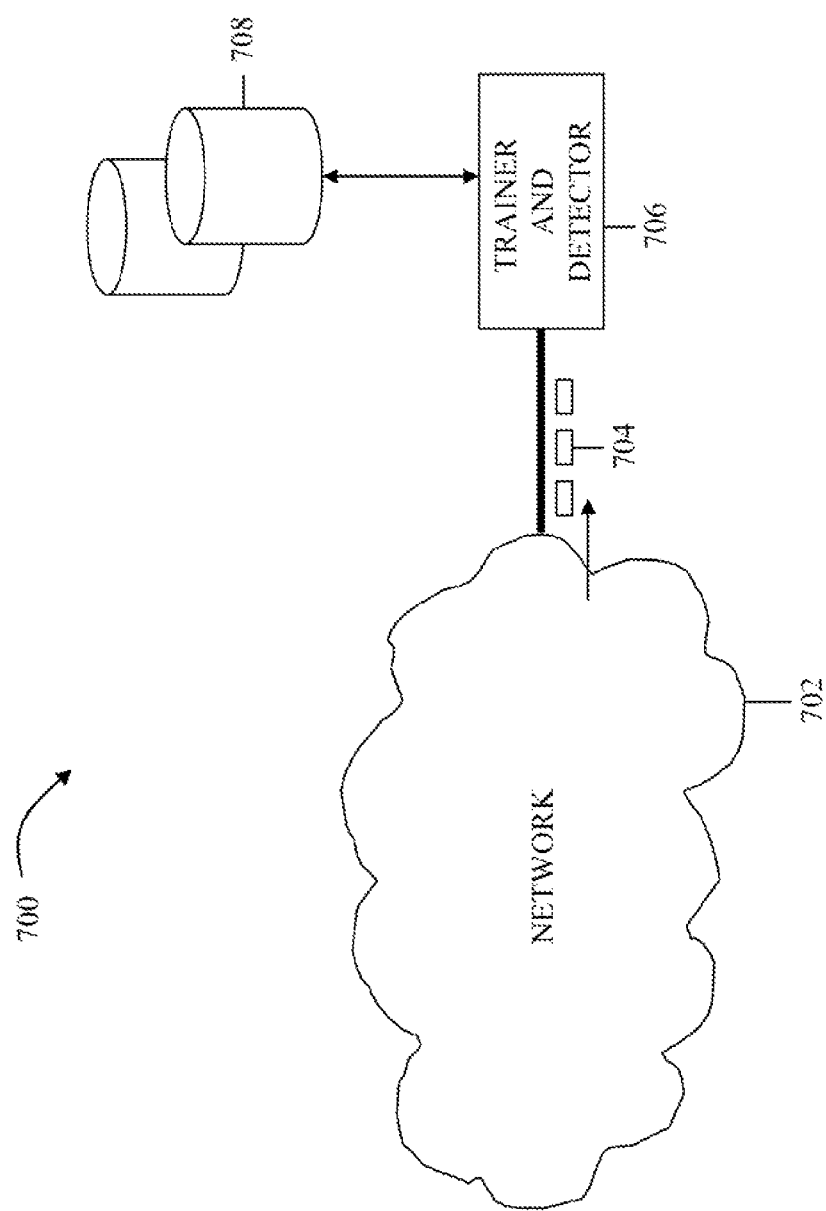
FIG. 7 is a schematic diagram of a system for outputting a dataset based upon anomaly detection in accordance with some embodiments of the disclosed subject matter.

FIG. 7 is a schematic diagram of a system 700 for outputting a dataset based on anomaly detection in accordance with some embodiments. As illustrated, system 700 includes a network 702, data traffic 704, a detector 706, and a data structure 708.

Network 702 can be a local area network (LAN), a wide area network (WAN), a wireless network, the Internet, and/or other suitable networks from which malicious attacks can be launched.

Data traffic 704 can include one or more network data packets, data frames, one or more files that contain various types of data, such as text, graphic images, sound samples, video samples, and computer-executable codes, a stream of data in bytes or a stream of other suitable symbols or tokens in one or more communication sessions, and/or other data in suitable formats.

Trainer and detector 706 can be various devices capable of performing some or all of the functions described above in connection with FIG. 1-6. For example, trainer and detector 706 can be implemented in a computer, a digital processing device, a server, a processor, phone, a personal data assistant, an email device, and/or various other suitable devices.

Data structure 708 can be a data structure that allows for storing data as described above in connection with the descriptions of FIG. 1-6. Data structure 708 may be implemented in random access memory (RAM), flash memory, a disk drive, optical media, and/or various other suitable storage technologies.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for outputting a dataset based upon anomaly detection, the method comprising:
   receiving, using a hardware processor, an input dataset;
   determining, using the hardware processor, an anomaly detection score that is indicative of the presence of anomalous n-grams in the input dataset by applying a content anomaly detection model to the received input data, wherein the content anomaly detection model is trained with data that includes training n-grams and wherein the anomaly detection score is based on a comparison of n-grams in the input dataset, which each represent a sequence of n bytes, with the training n-grams; and
   causing, using the hardware processor, the input dataset to be outputted based on the anomaly detection score.

2. The method of claim 1, wherein the content anomaly detection model is a frequency distribution-based detection model that determines a plurality of appearance frequencies, and wherein each of the plurality of appearance frequencies corresponds to one of the training n-grams.

3. The method of claim 2, wherein the training n-grams include a first plurality of distinct training n-grams and a second plurality of distinct training n-grams.

4. The method of claim 3, further comprising:
   determining a first plurality of appearance frequencies corresponding to the first plurality of distinct training n-grams; and
   determining a second plurality of appearance frequencies corresponding to the second plurality of distinct training n-grams; and
   determining a first anomaly detection score based on the first plurality of appearance frequencies and a second anomaly detection score based on the second plurality of appearance frequencies.

5. The method of claim 4, further comprising:
   determining which of the first anomaly detection score and the second anomaly detection score is higher; and
   outputting the input dataset based on the anomaly detection score that is higher.

6. The method of claim 1, wherein the content anomaly detection model is a binary-based detection model that determines a number of distinct n-grams in the input dataset and a total number of n-grams contained in the input dataset.

7. A system for outputting a dataset based upon anomaly detection, the system comprising:
a hardware processor that:
receives an input dataset;
determines an anomaly detection score that is indicative of the presence of anomalous n-grams in the input dataset by applying a content anomaly detection model to the received input data, wherein the content anomaly detection model is trained with data that includes training n-grams and wherein the anomaly detection score is based on a comparison of n-grams in the input dataset, which each represent a sequence of n bytes, with the training n-grams; and
causes the input dataset to be outputted based on the anomaly detection score.

8. The system of claim 7, wherein the content anomaly detection model is a frequency distribution-based detection model that determines a plurality of appearance frequencies, and wherein each of the plurality of appearance frequencies corresponds to one of the training n-grams.

9. The system of claim 8, wherein the training n-grams include a first plurality of distinct training n-grams and a second plurality of distinct training n-grams.

10. The system of claim 9, wherein the system is further configured to:
determine a first plurality of appearance frequencies corresponding to the first plurality of distinct training n-grams; and
determine a second plurality of appearance frequencies corresponding to the second plurality of distinct training n-grams; and
determine a first anomaly detection score based on the first plurality of appearance frequencies and a second anomaly detection score based on the second plurality of appearance frequencies.

11. The system of claim 10, wherein the system is further configured to:
determine which of the first anomaly detection score and the second anomaly detection score is higher; and
output the input dataset based on the anomaly detection score that is higher.

12. The system of claim 7, wherein the content anomaly detection model is a binary-based detection model that determines a number of distinct n-grams in the input dataset and a total number of n-grams contained in the input dataset.

13. A non-transitory computer-readable medium containing computer-executable instructions that, when executed by a processor, cause the processor to perform a method for outputting a dataset based upon anomaly detection, the method comprising:
receiving an input dataset;
determining an anomaly detection score that is indicative of the presence of anomalous n-grams in the input dataset by applying a content anomaly detection model to the received input data, wherein the content anomaly detection model is trained with data that includes training n-grams and wherein the anomaly detection score is based on a comparison of n-grams in the input dataset, which each represent a sequence of n bytes, with the training n-grams; and
causing the input dataset to be outputted based on the anomaly detection score.

14. The non-transitory computer-readable medium of claim 13, wherein the content anomaly detection model is a frequency distribution-based detection model that determines a plurality of appearance frequencies, and wherein each of the plurality of appearance frequencies corresponds to one of the training n-grams.

15. The non-transitory computer-readable medium of claim 14, wherein the training n-grams include a first plurality of distinct training n-grams and a second plurality of distinct training n-grams.

16. The non-transitory computer-readable medium of claim 15, wherein the method further comprises:
determining a first plurality of appearance frequencies corresponding to the first plurality of distinct training n-grams; and
determining a second plurality of appearance frequencies corresponding to the second plurality of distinct training n-grams; and
determining a first anomaly detection score based on the first plurality of appearance frequencies and a second anomaly detection score based on the second plurality of appearance frequencies.

17. The non-transitory computer-readable medium of claim 16, wherein the method further comprises:
determining which of the first anomaly detection score and the second anomaly detection score is higher; and
outputting the input dataset based on the anomaly detection score that is higher.

18. The non-transitory computer-readable medium of claim 13, wherein the content anomaly detection model is a binary-based detection model that determines a number of distinct n-grams in the input dataset and a total number of n-grams contained in the input dataset.

* * * * *